June 18, 1968  N. G. KLING  3,388,687
TIMING DEVICE

Filed Nov. 12, 1964  2 Sheets-Sheet 1

INVENTOR.
Nelson G. Kling
BY Harry Cohen
ATTORNEY

June 18, 1968  N. G. KLING  3,388,687
TIMING DEVICE
Filed Nov. 12, 1964  2 Sheets-Sheet 2
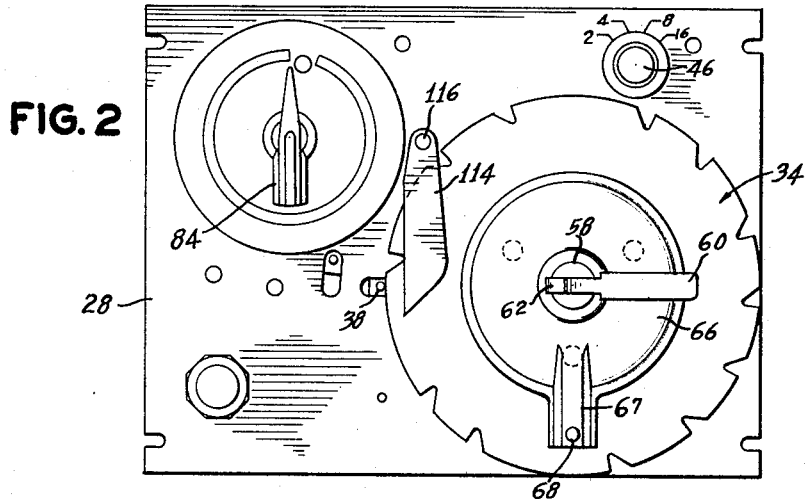
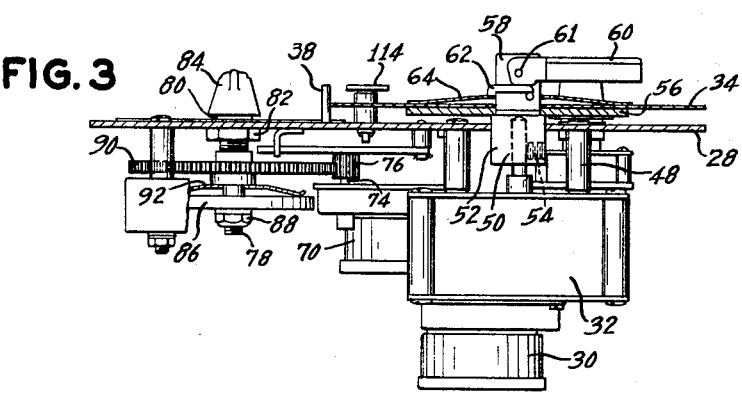
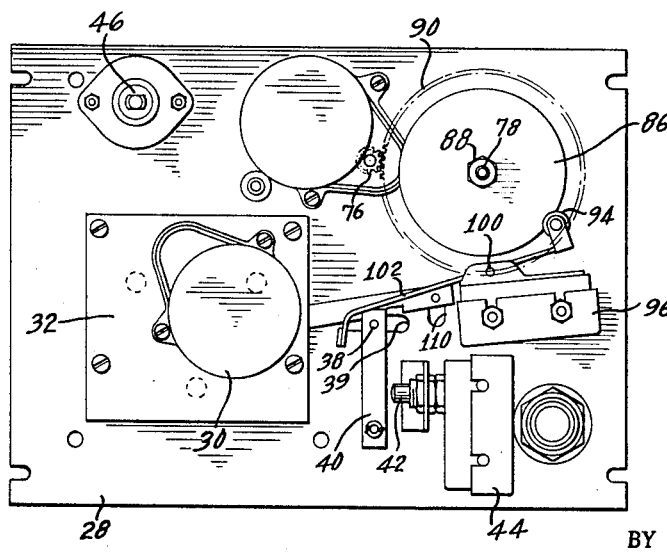
INVENTOR.
Nelson G. Kling
BY
ATTORNEY United States Patent Office 3,388,687
Patented June 18, 1968

3,388,687
TIMING DEVICE
Nelson G. Kling, Ringwood, N.J., assignor to Technicon Corporation, a corporation of New York
Filed Nov. 12, 1964, Ser. No. 410,597
4 Claims. (Cl. 118—9)

ABSTRACT OF THE DISCLOSURE

A time device for a sequential immersion device has a conveyor for sequentially immersing a material container during an operating cycle in each of a plurality of liquid containers under the control of a first clock and multiple dwell cam assembly, and a second clock and cam assembly for controlling the start of the immersion operating cycle.

---

This application relates to automatic immersion apparatus which is especially suitable for the preparation of histologic tissue for microscopic examination, and, more particularly, to a time delay mechanism for such apparatus.

Automatic immersion apparatuses are shown in the U.S. Patent No. 2,157,875, granted May 9, 1939, U.S. Patent No. 2,872,893, granted Feb. 9, 1959, and U.S. Patent No. 3,110,627, granted Nov. 12, 1963. In these apparatuses a tissue container is successively immersed for predetermined intervals of time in containers of different liquids to initially fix the tissue, then to wash the tissue to remove the fixative then to dehydrate the tissue, then to clear the tissue, and finally to infiltrate the tissue with an agent such as paraffin. Such an infiltration process may occupy, by way of example, sixteen hours. Under suitable ambient conditions the time required may only be a few hours, or less. The same apparatus, with different liquids, may be used to stain samples of the tissue after they have been cut from the larger infiltrated mass. Such a staining process may occupy, by way of example, an hour or less. The programming of such procedures has been controlled by a cam driven by a constant speed motor to operate a follower-switch.

It is desirable that the technician be able to preload the tissue into the apparatus, for example at the end of a working day or even before a weekend, and have the apparatus start its procedure at such a time that the procedure will end at the beginning of the next working day. U.S. Patent No. 2,894,482 shows a delay timer which is operated by the same constant speed motor which operates the main program timer cam. Since both timers are operated by the same motor, there is of necessity a fixed total time relationship between the two.

It is an object of this invention to provide a program timer and a delay timer which are adjustably independent of each other.

It is another object of this invention to provide a program timer which is adjustable with respect to the maximum interval of time which may be programmed without affecting the maximum interval of time for which the initiation of the program cycle may be delayed.

A feature of this invention is the provision of a first constant speed motor and an adjustable transmission for the program timer cam and a second constant speed motor for the delay timer cam.

These and other objects, features and advantages of this invention will be fully understood from the following description considered in connection with the accompanying illustrative drawings of the presently preferred embodiment of this invention, in which:

FIG. 2 is an enlarged view, in elevation, of the control panel of the automatic immersion apparatus;

FIG. 3 is a bottom view of the apparatus of FIG. 2;

FIG. 4 is a rear view, in elevation, of the apparatus of FIG. 2; and

Figure 1:
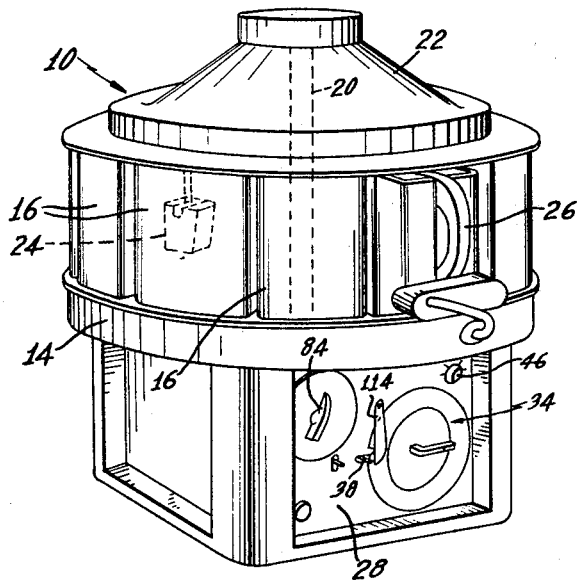
FIG. 1 is a perspective view of an automatic immersion apparatus which is provided with a time delay control device pursuant to the present invention.
Figure 5:
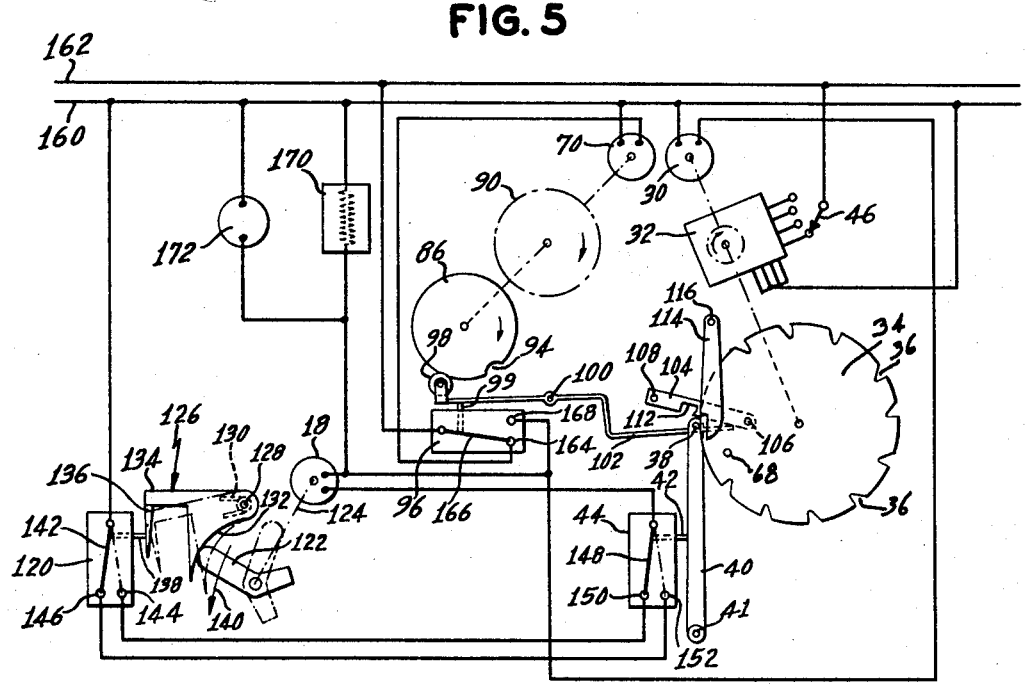
FIG. 5 is a wiring diagram combined with a more-or-less diagrammatic illustration of various components of the apparatus.

The automatic immersion apparatus 10 is provided with a base or housing 12 which mounts a support 14 for a plurality of receptacles 16 which contain the various liquids required for the tissue processing operation. The apparatus includes an electrical means or motor 18 operating or actuating a conveyor mechanism 20 or moving means for moving a cover 22 to which is mounted a basket or tissue holder 24. The holder is moved successively into and out of the several liquid receptacles 16 and finally into a heated paraffin bath 26. The conveyor motor 18 operates under the control of a program timing mechanism 26. The program timing mechanism 26 is mounted on a panel 28 secured in the housing 12.

The program timing mechanism 26 includes a constant speed motor 30 which drives a gear transmission 32 which in turn drives a cam 34. The cam has a plurality of dwells 36 about its periphery which will receive a pin 38 passing through a slot 39 in the panel 28 and fixed to the distal end of an arm 40 which is pivoted at 41. The distal end of the arm 40 is biased towards the cam by the actuator 42 of a snap action switch 44. The gear transmission is operated by relays mounted within the housing of the transmission, one of which is energized by a selector switch 46, to cause the cam 34 to be rotated at 2, 4, 8 or 16 hours per revolution. The motor 30 is mounted to the housing of the transmission 32 which is mounted to the panel 28 by suitable bolts in stand-off spacers 48. The output drive shaft 50 of the transmission passes through an opening in the panel 28 and has a collar 52 fixed thereto by a set screw 54. A support disk 56 and a shaft 58 are fixed to the collar 52. A handle 60 is pivotally mounted to the shaft 58 at 61 and has a cam surface which bears against a clamp element 62 which in turn is adapted to bear on a spider 64 and a disk 66 which has a radially extending portion 67 supporting an upstanding pin 68. When the handle 60 is raised from the position shown in FIG. 2, coaxial with the staff 58, the disk 66, the spider 64 and the clamp element 62 may be removed, the cam 34 may be slid on, and the disk, the spider and the clamp element slid back on thereover. When the handle is swung down the clamp element and the spider hold the cam against rotation with respect to the support disk 56 and the disk 66.

A second constant speed motor 70 is mounted to the panel 28 by stand-off spacers and bolts and has an output shaft 74 to which a pinion gear 76 is fixed. A shaft 78 is rotatably mounted in a bearing 80 which passes through a hole on the panel 28 and is fixed thereto by a nut 82. A handle 84 is keyed and fixed to the front end of the shaft 78 and a cam 86 is keyed and fixed by a nut 88 to the other end of the shaft 78. A gear 90 is freely mounted on the shaft 78 and meshes with the pinion gear 76. A spider 92 is fixed to the gear 90 for rotation therewith. The hubs of the spider and the gear act as spacers on the shaft 78 and the spider is compressed, frictionally engaging the gear 90 to the cam 86, and normally rotates the cam with the gear when it is driven by the motor 70. However, the handle may be manually rotated against the friction of the spider to change the angular relationship between the cam and the gear.

The cam 86 has a single dwell 94. A snap action or master control switch 96 has a follower-arm 98 which is biased by the switch actuator 99 to ride on the cam 86. The speed of the motor 70 and the ratios of the gears 76 and 90 are arranged so that the cam rotates at the rate of 72 hours per revolution. The handle 84 may be rotated to angularly space the dwell 94 away from the follower 98 by any desired angle, to adjustably set the delay which will occur between the energization of the motor 70 and the actuation of the switch 96. The motor 70, the cam 86 and the switch 96 comprise adjustable clock means.

The follower-arm 98 is pivoted at 100 and includes an extension arm 102. An arm 104 is pivotally mounted at one end at 106 behind the panel 28 and has an upstanding pin 108 at its distal end which passes forwardly through a slot 110 in the panel 28. The distal end of arm 102 normally engages and elevates the lower edge of the arm 104 when the follower 98 is riding on the rise of the cam 86. When the follower 98 enters the dwell 94 of the cam 86 it permits the arm 104 to fall. The lower edge of the arm 104 includes a cut-out or notch 112. When the follower 98 enters the dwell 94, and the arm 102 releases the arm 104, the arm 104 falls until its lower edge is supported by the pin 38. An arm 114 is pivotally mounted on the front of the panel 28 at 116, with its distal end adjacent the pin 38. The pin 38 is free to enter the notches 36 without abutting the arm 116. However, when the cam 34 and the disk 66 carrying the upstanding pin 68 have rotated sufficiently, the pin 68 will abut the lower right rounded end of the arm 116, camming the arm 116 clockwise to abut the pin 38, shifting the pin leftwardly along the lower edge of the arm 104, until the pin 38 is below the notch 112. When the arm 104 is not otherwise supported by the arm 102 it falls, capturing the pin 38 in the notch 112, and thereby preventing the pin 38 from subsequently entering any notch 36.

The operation of the conveyor motor 18 is controlled by the snap-action switches 96, 44 and 120. The state of the snap action switch 120 is dependent on the operation of the conveyor mechanism by the motor 18. For example, the motor 18 drives a cam member 122 by means of a linkage 124. The cam member 122 cooperates with a switch operator 126 which is pivotally mounted at 128. The switch operator is biased by a spring 130 to rotate counter-clockwise. The switch operator is provided with a cam face portion 132 and with an arm portion 134 which extends outwardly and away from the cam face portion and which arm has a depending portion 136 for operating the actuator 138 of the snap action switch 120. The cam member 122 is operated counter-clockwise as indicated by the arrow 140, to first pivot the switch operator 126 clockwise to operate the actuator 138 so that a movable contact 142 is moved from a fixed contact 144 to a fixed contact 146. The continued travel of the member 122 along the cam face portion 132 permits the switch operator 126 to return under the bias of the spring 130 to restore the movable contact 142 to the fixed contact 144.

The state of switch 44 is dependent on whether the pin 38 (1) rides on the periphery of the timing disk 34, (2) falls in a timing dwell 36, or (3) is captured by the notch 112 of the arm 104 as a result of the abutment of the arm 114 by the pin 68.

When the pin 38 rides on the periphery of the disk 34, the arm 40 operates the actuator 42 so that a movable contact 148 is moved to a fixed contact 150, which is connected to the contact 144. When the pin 38 falls into a dwell 36, the arm 40 releases the actuator so that the movable contact 148 is moved to a fixed contact 152, which is connected to the contact 146. When the pin 138 is captured by the notch 112, the movable contact 148 is moved to the fixed contact 150.

The system is energized by a pair of power lines 160 and 162. The delay timer motor 70 has one terminal connected to the line 160 and its other terminal connected to a fixed contact 164 of the snap action switch 96, which has a movable contact 166 and another fixed contact 168. The movable contact 166 is connected to the line 162. When the follower 98 is on the rise of the cam 86 the movable contact 166 is moved to the fixed contact 164, and thus the motor 70 is energized. The program timer motor 30 has one terminal connected to the line 160 and its other terminal connected to the fixed contact 168 of the snap action switch 96. When the follower 98 enters the dwell 94 of the cam 86 at the end of the delay interval the movable contact 166 is moved from the fixed contact 164 to the fixed contact 168. The delay motor 70 is thus de-energized, and the program motor 30 is energized. A heater 170 for the paraffin bath 26 has one terminal connected to the line 160 and its other terminal coupled to the fixed contact 168. A motor 172 for oscillating the tissue container 24 when it is immersed in a processing liquid has one terminal connected to the line 160 and its other terminal coupled to the fixed contact 168. Thus when the program motor 30 is energized, the heater 170 and the motor 172 are also energized.

Prior to the operation of the system the arm 104 is raised manually to its upper position, by means of its pin 108 projecting through the slot 110 in the panel 28. The arm 40 is thus free to rotate clockwise under the bias of the switch actuator 46 so that the pin 38 rests under the lower edge of the arm 104. The delay timer cam 86 is manually rotated to move the dwell 94 away from the follower-arm 98 by the desired angular distance, which is equal to the desired time delay interval. The program cam 34 is manually aligned so that the first dwell 36 is adjacent the pin 38, and the correct rotational speed is manually established by the switch 46. The lines 160 and 162 are energized and the motor 70 is energized via fixed contact 164. When the delay interval ends, the motor 70 is de-energized, and the motor 30 is energized via fixed contact 168. The pin 38 enters the first notch 36 permitting the biased movable contact 148 to move to the fixed contact 152. The conveyor motor 18 is now energized via the line 162, the movable contact 166, the fixed contact 168, the motor 18, the movable contact 148, the fixed contact 152, the fixed contact 146, the movable contact 142 and the line 160.

The motor 18 drives the cam member 122 causing the tissue holder 24 to be raised up from one liquid receptacle 16 and to be brought over the next tissue receptacle, by a Geneva mechanism as shown in U.S. Patent No. 2,157,875, supra. The member 122 leaves the cam face portion 132, permitting the movable contact to move to the fixed contact 144, de-energizing the motor 18. The motor 30 continues its constant rotation, however, and the notch 36 rides out from under the pin 38, moving the arm 40 counter clockwise to cause the movable contact 148 to move to the fixed contact 150. The motor 18 is again energized via the line 162, the movable contact 166, the fixed contact 168, the motor 18, the movable contact 148, the fixed contact 150, the fixed contact 144, the movable contact 142 and the line 160.

The motor 18 is energized for a short interval of time while the tissue holder is lowered into the liquid, as the member 122 rapidly moves the operator 126 clockwise to cause the movable contact 142 to move to the fixed contact 146 to de-energize the motor. The motor 18 remains de-energized until a new transfer cycle is started by the next dwell 36 receiving the pin 38. When the processing cycle is over, the pin 68 strikes the arm 114, causing it to shift the pin 38 along the underside of the arm 104 until it is captured by the notch 112. The motor 18 is at that time de-energized between transfer cycles, and the tissue holder 24 is in the paraffin bath. Although the motor 30 remains energized, the apparatus has ended its processing of the tissue and awaits the arrival of the technician.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Immersion apparatus comprising: means for moving a material holder into and out of each of a plurality of receptacles; means for actuating said moving means; timing means including a clock motor means for controlling the normal operations of said actuating means to provide predetermined periods during which said material holder is positioned within said receptacles, respectively; adjustable delay means for rendering said timing means ineffective for a predetermined period of time to control the operation of said actuating means; said delay means including a master control switch means having a first condition for providing power to said clock motor means and a second condition for omitting power to said clock motor, and also having an additional clock motor means coupled to said switch means for normally maintaining said switch means in said second condition in which said switch means supplies power to said additional clock motor means and upon the expiration of said last mentioned predetermined period of time for disposing said switch means in said first condition and simultaneously decoupling power from said additional clock motor means.

2. Apparatus according to claim 1 wherein said master control switch means, when in said first condition also provides power to said activating means.

3. Apparatus according to claim 1 wherein said actuating means is electrically powered.

4. Immersion apparatus comprising: means for moving a material holder into and out of each of a plurality of receptacles; electrical means for actuating said moving means; timing means including a clock motor coupled to said electrical actuating means for controlling the normal operations of said electrical actuating means to provide predetermined periods during which said material holder is positioned within successive respective material holders; adjustable delay means coupled to said timing means for rendering said timing means ineffective for a predetermined period of time; said delay means including an additional clock motor, and control switch means coupled to said additional clock motor and to said timing means for decoupling said timing means during the predetermined period of time and for decoupling said additional clock motor subsequent to the predetermined period of time.

References Cited
UNITED STATES PATENTS 2,894,482   7/1959   Gorham _____ 118—11

CHARLES A. WILLMUTH, *Primary Examiner.*

JOHN P. McINTOSH, *Assistant Examiner.*